United States Patent [19]
McCloskey

[11] 3,750,001
[45] July 31, 1973

[54] REMOTE, COMPLETELY SELF-CONTAINED, SELF-MAINTAINING POWER SUPPLY APPARATUS FOR POWERING A PRESSURIZED-LIQUID DISTRIBUTING AND DISSEMINATING SYSTEM

[76] Inventor: Edward W. McCloskey, 271 Alpine St., Pasadena, Calif. 91106

[22] Filed: Oct. 15, 1970

[21] Appl. No.: 80,999

Related U.S. Application Data

[63] Continuation-in-part of Ser. No. 880,851, Nov. 28, 1969, Pat. No. 3,642,204.

[52] U.S. Cl............................ 320/61, 290/43, 290/52
[51] Int. Cl........ F03b 13/10, H02k 7/18, H02j 7/32
[58] Field of Search......................... 322/40, 28, 35; 320/12, 61; 290/43, 52

[56] References Cited
UNITED STATES PATENTS

| | | | |
|---|---|---|---|
| 1,705,673 | 3/1929 | Menzies............................ | 320/46 X |
| 2,436,683 | 2/1948 | Wood, Jr. .............................. | 290/52 |
| 2,518,129 | 8/1950 | Eichorn ............................ | 322/40 X |
| 2,782,321 | 2/1957 | Fischer .............................. | 290/52 X |
| 2,787,715 | 4/1957 | Danel................................... | 290/52 |
| 3,193,751 | 7/1965 | Cadiou.............................. | 320/61 X |

FOREIGN PATENTS OR APPLICATIONS

746,111  11/1966  Canada................................ 290/52

*Primary Examiner*—J. D. Miller
*Assistant Examiner*—Robert J. Hickey

[57] ABSTRACT

One or more completely independent power supply means, each intended for powering one or more power utilization devices associated with a pressurized-liquid-transmission system, and the combination thereof with an automatically controlled, pressurized distributing and disseminating system which, in a preferred form, includes a pressurized-liquid-transmission main pipe means and, for each self-contained powering unit, at least one servo motor means and a power utilization device operated thereby and associated with the pressurized-liquid-transmission main pipe means in a particular desired pressurized-liquid-flow-modifying manner. In a preferred form, the power supply apparatus includes electrical energy storage means and pressurized-liquid-flow-powered electrical generating means for recharging the electrical energy storage means, in one preferred form in a manner which is effectively a function of the deficiency of the magnitude or quantity of electrical energy stored in the electrical energy storage means.

7 Claims, 11 Drawing Figures

INVENTOR.
EDWARD W. McCLOSKEY

REMOTE, COMPLETELY SELF-CONTAINED, SELF-MAINTAINING POWER SUPPLY APPARATUS FOR POWERING A PRESSURIZED-LIQUID DISTRIBUTING AND DISSEMINATING SYSTEM

CROSS REFERENCES TO RELATED APPLICATIONS

This Application is a continuation in part of application Ser. No. 880,851, filed Nov. 28, 1969, now U.S. Pat. No. 3,642,204.

Generally speaking, the present invention comprises a remote, completely self-contained and completely self-maintaining power supply apparatus intended primarily for use in powering a pressurized-liquid distributing and disseminating system, or selected portions thereof, and, in one preferred form, in an automatically controlled manner. Also generally speaking, the present invention includes the combination of one or a plurality of such a remote, completely self-contained, self-maintaining power supply apparatus and such a pressurized-liquid distributing and disseminating system. In a preferred version of the latter combination form of the invention, the pressurized liquid distributing and disseminating system may include a pressurized-liquid-transmission main pipe means and, for each distributing station, at least one servo motor means and a corresponding power utilization device operated thereby and associated with a corresponding portion of the pressurized-liquid-transmission main pipe means in a particular desired pressurized-liquid-flow-modifying manner, and, with each such distributing station, in a preferred form of the invention, also having a corresponding one of said remote, completely self-contained, self-maintaining power supply apparatuses. Generally speaking, it may be said that each electrical energy supply means, or power supply apparatus, is adapted to be effectively coupled with respect to a pressurized-liquid-transmission main pipe means in what might be termed both an energy-storing manner and an energy-releasing manner.

In a preferred form, the electrical energy supply means may comprise electrical energy storage means adapted to be connected with respect to a servo motor means adapted to be coupled with respect to a power utilization device associated with the pressurized-liquid-transmission main pipe means in a particular desired pressurized-liquid-flow-modifying manner, which may be said to comprise one form of the above-mentioned energy-releasing manner.

In one preferred form, the electrical energy supply means may also comprise a pressurized-liquid-flow-powered electrical generating means electrically coupleable in the above-mentioned energy-storing manner with respect to said electrical energy supply means for periodically producing and storing electrical energy in said electrical energy storage means when pressurized liquid flow through at least a corresponding portion of said main pipe means and relative to said pressurized-liquid-flow-powered electrical generating means occurs, and when said electrical energy storage means has stored therein less than a predetermined magnitude or quantity of electrical energy, usually as indicated by the output voltage thereof.

In a preferred form of the invention, generator output modifying means is also included and is effectively coupled with respect to the electrical generating means in a manner modifying the electrical output thereof as a function of, and in response to, a deficiency of the magnitude or quantity of electrical energy stored in the electrical energy storage means so that the electrical energy storage means will be recharged at what might be termed a "demand rate" corresponding to the need for rapidity in recharging. This is important where the discharging periods are frequent or bear greater than a predetermined ratio of discharging to charging time or where the amount of electrical energy discharged during discharging periods is relatively great because of high electric power utilization by the electric power utilization device or servo motor means associated with the pressurized-liquid-transmission main pipe means in a particular desired pressurized-liquid-flow-modifying manner.

In one preferred form, the generator output modifying means may include an input portion effectively coupled with respect to the electrical energy storage means and an output portion coupled with respect to the electrical generating means in both a mechanical and electrical output modifying manner. In this form of the invention, the input portion may comprise an effective comparator means for comparing the quantity or magnitude of electrical energy, or the voltage thereof, stored by the electrical energy storage means with a predetermined reference standard corresponding to a fully charged condition of said electrical energy storage means and for producing a corresponding output error electrical signal of a corresponding magnitude and sense adapted to be electrically coupled with respect to said output portion, which may comprise a reversible servo motor means driving a generator output changing means, in one preferred form of the invention, whereby to cause the electrical output of the generator to be changed in a manner which is a direct function of the stored energy deficiency sensed by said comparator means.

One preferred form of the invention is also provided with effective negative feedback means responsive to the extent of movement of the above-mentioned servo motor means, and the generator output changing means driven thereby, for progressively reducing the magnitude of the output error electrical signal produced by said input portion as a function of the deficiency of the magnitude or quantity of electrical energy stored by the electrical energy storage means, whereby to reduce said output error electrical signal to zero magnitude and to deenergize said servo motor means coupled to said generator output changing means at an extent of generator output modification, which is a function of said stored electrical energy deficiency.

In one preferred form of the invention, the above-mentioned effective comparator means and the above-mentioned effective negative feedback means effectively comprise Wheatstone bridge means having a first leg provided with an impedance effectively variable in response to the above mentioned deficiency of the electrical energy stored in said electrical energy storage means; a second leg having an impedance of a predetermined or reference magnitude corresponding to, and effectively a function of, a reference standard means; a third leg connected in parallel to said first leg and having an impedance modifiable by said effective negative feedback means; and, in a preferred form, having a fourth leg provided with a fixed or reference standard impedance.

The generator output changing part of said output portion, in a preferred form of the invention, comprises pressurized-liquid-flow-modifying means, such as valve means, or the like, for modifying the flow of pressurized liquid which is effectively coupled in driving relationship with respect to the pressurized-liquid-flow-powered electrical generating means so as to cause a corresponding modification of the electrical output thereof. In another or alternate form of the invention, the generator output changing part of said output portion comprises a rotor orientation modifying means adapted to modify the effective blade pitch or coupling, with respect to the flowing liquid, of a rotor which is in driving relationship with respect to a mechanical-to-electrical energy converter and together effectively comprising said electrical generating means.

In a further alternate form of the invention, the generator output changing part of said output portion may include variable ratio, power transmission means effectively positioned between such a rotor means and such a mechanical-to-electrical electrical converter means of the electrical generating means for changing the ratio of the driven rotation of said mechanical-to-electrical converter means relative to said rotor means in a manner adapted to correspondingly modify the electrical output produced by said mechanical-to-electrical converter means.

Also generally speaking, it should be noted that each electrical energy power supply means may be arranged to be placed in the previously mentioned energy-releasing condition by receipt of a control signal which may be produced locally by any of a variety of different types of senser means or may be produced remotely and transmitted to and received by a local receiving means which may be of a selective type, in certain forms of the invention, so as to cause the operation of only a certain particular power utilization device (or a particular plurality thereof) or of an entire group of same in correspondence with the number and types of said control signals effectively transmitted, either from one or more local or remote sources, to each such self-contained unit of the present invention.

With the above points in mind, it is an object of the present invention to provide an improved remote, completely self-contained and self-maintaining power supply apparatus intended primarily for powering a pressurized liquid distributing and disseminating system, per se, and also in combination with such a system, with the combination so defined having any or all of the advantages referred to herein and including any or all of the features referred to herein, generically and/or specifically and individually or in combination, and which is of a relatively simple, inexpensive, easily manufactured construction, both as to initial capital cost (including the tooling cost, etc.), and as to the cost of production per item or unit and, in particular, not requiring great lengths of interconnecting electrical wire as has been conventionally required in prior art systems, whereby to facilitate the widespread and large-scale manufacture, sale, and use of the invention for the purposes outlined herein (or for any substantial functional equivalents thereof).

Further objects are implicit in the detailed description which follows hereinafter (which is to be considered as exemplary of, but not specifically limiting, the present invention), and said objects will be apparent to persons skilled in the art after a careful study of the detailed description which follows hereinafter, and all such implicit objects are intended to be included and comprehended herein as fully as if particularly defined and pointed out herein.

For the purpose of clarifying the nature of the present invention, several exemplary embodiments of the invention are illustrated in the hereinbelow-described figures of the accompanying drawings and are described in detail hereinafter.

FIG. 1 is a greatly reduced-size, fragmentary, partially broken-away, somewhat schematic and diagrammatic view illustrating two different units of one exemplary embodiment of the present invention in association with an automatic irrigation system, with each of the units being remote and completely mechanically and electrically isolated from each other and each being, in effect, a self-contained power supply means adapted to provide, upon demand, the necessary power to operate the corresponding adjacent water-dispensing valve means of the irrigation system for supplying the corresponding sprinkler means, or other water outlet or dispensing means, with water under the control of an initiating and controlling signal provided by moisture-sensing means in communication with a nearby portion of the soil so that each part of the sprinkler system is, in effect, completely independently controlled and caused to operate or to not operate quite apart from all other similar portions of the automatic irrigation system.

FIG. 8 is a fragmentary, partially broken-away, somewhat diagrammatic and schematic view similar in many respects to FIG. 6 but illustrates, again in somewhat diagrammatic and schematic form, one exemplary modified arrangement for causing the electrical output of the generator means to be an effective function of the need for electrical power for quickly recharging the depleted storage battery. In this example, this is made possible by the provision of controllably modifiable variable coupling means for effectively coupling the rotary part of the electrical generator means to the pressurized liquid impinging thereupon so as to effectively extract greater or lesser power therefrom in accordance with the effective coupling thereto. In the example illustrated, the variable coupling just mentioned is provided by means for varying the pitch of the blade portions of the generator rotor — this being accomplished by an electric motor reversibly operating the pitch-varying means as a function of the magnitude of the storage battery deficiency or depletion sensed by the voltage regulator means.

FIG. 9 is another fragmentary, partially broken-away, somewhat diagrammatic and schematic view similar to both FIGS. 6 and 8, but illustrating a further modification of the means for causing the electrical power output produced by the generator means to effectively be a function of the magnitude of the storage battery charge depletion or deficiency. In this modification, said means effectively comprises variable-ratio power transmission means, shown in block diagrammatic form in FIG. 9, effectively coupled between the pressurized-liquid-driven rotor part of the generator means and the electric power generating portion thereof, so that the rate of rotation of the electric power generating portion thereof can be modified by a corrective electric motor under the control of voltage regulator, or storage-battery-charge-deficiency sensing means, as a direct function of the storage battery charge deficiency, thus causing the electric power generated by the generator means to have a magnitude which is a direct function of the need therefor.

FIG. 10 is a view similar in many respects to FIG. 1, but illustrates another exemplary one of the many possible alternate systems which may embody the novel apparatus of the present invention therein for the purpose of remotely, and in a completely self-contained manner, providing the necessary electrical power to operate in any desired manner any of various different types of servo motor means under the control of an initiating and controlling signal of any of a variety of different types for effecting a corresponding local action. In this exemplary form, the very lengthy and fragmentarily shown alternate type of system comprises an oil pipeline which may be positioned either above the ground or below the ground, although in this case it is shown as lying substantially along the ground surface. Each unit of the apparatus of the present invention is adapted to provide power for operating appropriate servo motor means for operating diversion valve means or a variety of other desired apparatuses or means whenever a controlling and initiating signal is received from a remote transmitting station — in this case, remotely received by radio wave, although not specifically so limited.

Figure 1:
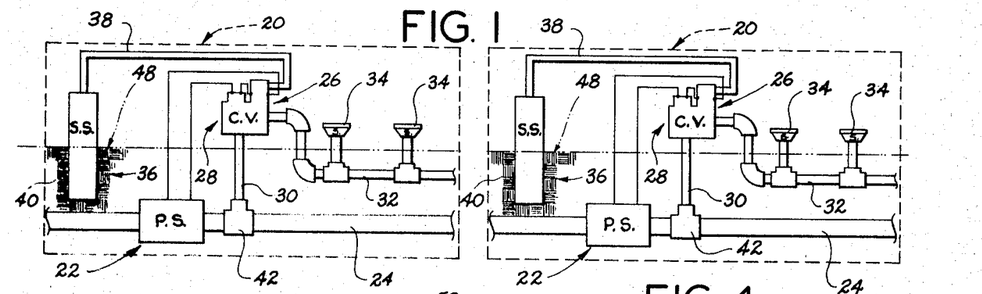

In the exemplary first form of the invention as shown in FIG. 1, the remote, completely self-contained, self-maintaining, power supply apparatus of one exemplary form of the invention is shown in association with each of two representative distribution stations, each of which is indicated in broken lines by the reference numeral 20 and each of which, in addition to the power supply means shown in block diagrammatic form at 22, also includes a corresponding portion of a pressurized-liquid-transmission main pipe means 24, a corresponding servo motor means, indicated generally at 26, and controlling a corresponding power utilization device, indicated generally at 28, and comprising in said FIG. 1 a main control valve effectively operated or controlled by the servo motor means 26 and associated with said pressurized-liquid-transmission main pipe means 24 (in the example illustrated, by way of a corresponding branch pipe 30), in a particular desired pressurized-liquid-flow-modifying manner which, in the example illustrated, comprises the control of the distribution and dissemination of water through a water distribution system, such as that comprised by the fragmentarily shown pipe portion 32 and sprinklers 34, although not specifically so limited.

In other words, in the exemplary first form of the invention, each of the distribution stations 20 is identical and comprises a part of an overall pressurized water transmission and distribution system which may include as many of said distribution stations as desired along the series length thereof, along parallel branches thereof, or in any combination of such series-positioned and/or parallel-positioned distribution stations.

In the example illustrated, each distribution station is adapted to be provided with a controlling and initiating signal for causing corresponding operation of the servo motor means 26 and consequent corresponding operation of the power utilization device 28 which, broadly speaking, takes the form of a main water flow control valve in the exemplary first form of the invention illustrated fragmentarily and in broken diagrammatic form in FIG. 1. In said exemplary first form of the invention, a means for providing such a controlling and initiating signal is shown in each of the two distribution stations 20 as taking the form of moisture-sensing means such as the soil-moisture sensor indicated in block diagrammatic form at 36 in each of the two instances illustrated in FIG. 1 and each of which is what might be termed a "soil tensiometer"]which produces a less than atmospheric pressure or suction which effectively comprises a controlling and initiating signal in the hollow signal duct 38 whenever the moisture content of the soil immediately surrounding the lower portion of said moisture-sensing means 36, as indicated at 40, for example, is of less than a predetermined, extremely moist, or saturated amount, magnitude, or condition. In other words, whenever the surrounding soil 40 begins to dry out, the pressure within the interior of the moisture-sensing means 36 falls and the reduced pressure or vacuum, which effectively comprises the previously mentioned controlling or initiating signal, is fed through the signal duct 38 to the servo motor means 26 for initiating the operation thereof in a corresponding manner which will cause the opening of the main water valve 28 and the dissemination of water therethrough and through the sprinklers 34 onto adjacent portions of the ground or earth until the moisture in said soil or earth 40 around the moisture-sensing means 36 rises to a predetermined magnitude and consequently causes the interior pressure within said moisture-sensing means to rise and to be transmitted, as said controlling and initiating signal, through the signal duct 38 to the servo motor means 26 and to cause a different type of operation thereof from that previously mentioned such as to either completely or partially close the main water valve 28 and to shut off or greatly reduce the emission of water from the sprinklers 34 whereby to maintain the mositure content of the soil 40 within predetermined upper and lower limits at all times and to do so in a completely automatic, self-contained, and self-maintaining manner.

Figure 2:
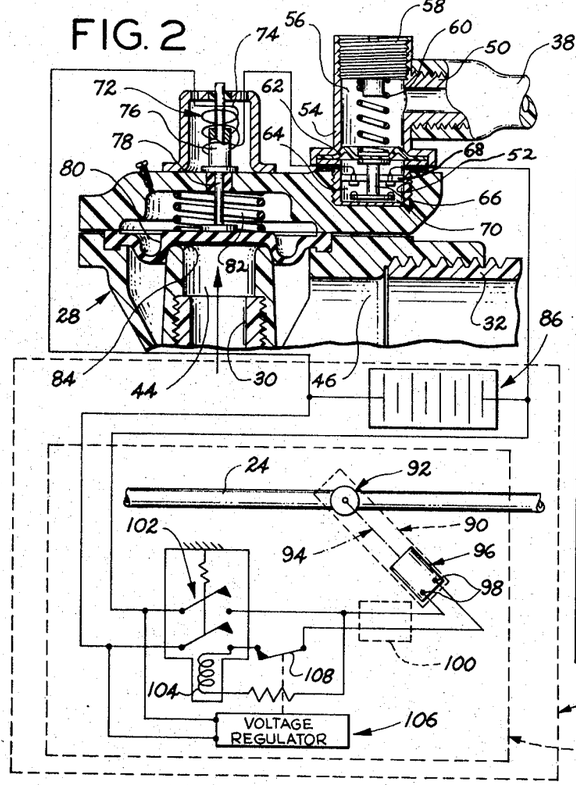
FIG. 2 is a fragmentary, larger-scale, partially brokenaway view, partly in section and partly in elevation, and illustrating in greater detail an exemplary one of the liquid-flow-controlling valve means of FIG. 1 taken on a substantially vertical central plane and also clearly illustrates one exemplary form of the self-contained power supply means in greater detail, and shows in somewhat diagrammatic and schematic form the electrical interconnections of the apparatus shown in this view.
Figures 3, 8:
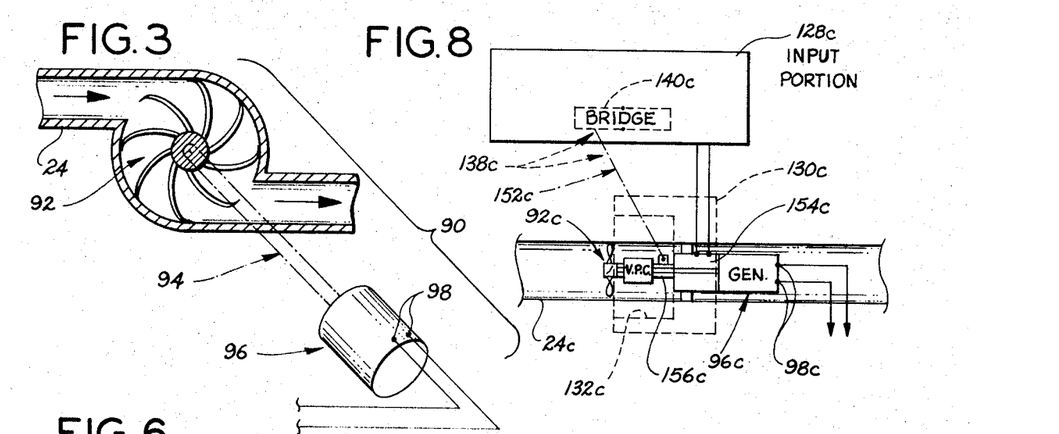
FIG. 3 is an enlarged, fragmentary, partially brokenaway, somewhat schematic view of one exemplary but non-specifically-limiting form of liquid-flow-powered electrical generating means electrically coupleable with respect to the electrical energy storing means through electrical rectifier means during charging periods, which correspond to liquid flow periods, so as to maintain the said electrical energy storage means in a substantially fully charged condition at all times immediately before use thereof for the purpose of operating the corresponding liquid-flow-controlling valve.

It should be understood that in the exemplary first form of the invention, at least one end of the brokenaway main water supply pipe 24 is adapted to be connected to a suitable source of water under pressure and that the other end is broken away for the purpose of indicating that it may be extended to virtually any desired length and may be connected in either series or parallel, or both, to virtually any desired number of distribution stations, such as the representative two indicated in broken lines at 20 in FIG. 1, for example. Also, it should be noted that while the exemplary first form of the invention illustrated has been referred to at some locations hereinabove and hereinbelow as a water distributing system, this is merely exemplary and virtually any liquid or fluid may be similarly distributed by the system, and the words "water" and "fluid" are to be broadly construed in the light of this statement throughout the specification and appended claims. It should be further noted that FIGS. 2 and 3 show only portions of one exemplary distribution station such as the two representative ones shown at 20 in FIG. 1.

In the exemplary first form illustrated, the water supply pipe 24 is connected by a T-fitting 42 to the previously mentioned branch pipe 30 which extends into a threaded inlet fitting 44 of the previously mentioned water-flow-controlling valve means, generally designated by the reference numeral 28. Said valve means 28 has a threaded outlet fitting 46 connected in sealed engagement with respect to an inlet end of the previously mentioned water distributing pipe 32. Normally, the inlet and outlet openings or ports 44 and 46 of the water-flow-controlling valve 28 are effectively sealed from each other by the interior valving mechanism of the valve 28, which will be described in some detail later on, but whenever the moisture-sensing means, generally designated by the reference numeral 36, senses that moisture in the body of soil 40 adjacent thereto is below a predetermined value, the reduction of pressure in the vacuum signal duct 38, effectively connected to the valve 28 by way of the servo motor means 26, effectively opens the interior valving mechanism of the valve 28 in a manner which places the inlet and outlet portions 44 and 46 in communication so that water from the main water supply line 24 can flow through the T-junction 42, the branch pipe 30, the inlet port 44, the outlet port 46, the water distributing pipe 32, and one or more of the sprinklers or other water-disseminating or irrigating outlets 34 into irrigating relationship with respect to the entire surface, indicated generally in phantom at 48, of the adjacent body of soil, which includes the previously mentioned body of soil 40 surrounding the moisture-sensing means 36. This condition of irrigating operation of the apparatus will continue until such time as the body of soil 40 surrounding the moisture-sensing means 36 becomes sufficiently saturated or moist as to cause the moisture-sensing means 36 to produce a relative increase in pressure within the vacuum signal duct 38 (compared to that which previously existed therein) to an extent such as to effectively cause the operation of the valving mechanism of the main valve 28, as a consequence of the initiating operation of the servo motor means 26, such as to effectively break the previously temporarily existing communication between the inlet and outlet ports 44 and 46 and to thus cause a cessation of the water flow or irrigating operation of the entire apparatus of that particular distribution station generally designated by the reference numeral 20. This "Off" condition of the apparatus is best shown in FIG. 2 and will continue until such time as the body of earth 40 around the moisture-sensing means 36 dries out to a degree such as to again cause the moisture-sensing means 36 to bring about a reduction in pressure in the vacuum signal duct 38 to an extent such as to again cause operation of the servo motor means 26 and the consequent operation of the valving mechanism of the main valve 28 and to cause the watering or "On" cycle of operation of the entire apparatus of that particular distribution station 20 to again resume the watering or irrigating operation previously described.

In other words, the entire flow-controlling apparatus of each distribution station generally designated at 20 in FIG. 1 continues to cycle between the "On" condition described above and the "Off" condition described above and illustrated in FIG. 2, at repetitive rates determined primarily by the combined rate of drainage and of evaporation of water from the body of earth 40 during the "Off" cycle and the rate of water irrigation or water dissemination from the sprinklers 34, or other functional equivalent, during the "On" cycle, and also by the lengths of the periods of duration of said "On" and "Off" cycles.

In the exemplary first form of the invention illustrated, it will be noted that the main water supply pipe 24 is buried beneath the surface 48 of the body of earth 40, which is also true of the sprinkler pipe 32 and the power supply means 22, while the remainder of the apparatus is positioned above the surface 48 of the body of earth 40. However, this arangement may be modified by burying any or all portions of the apparatus below the surface 48 of the body of earth 40 if desired. The arrangement illustrated in the exemplary first form of the invention is convenient since it places the water-flow-controlling valve means 28 above the surface 48 of the body of earth 40 in a position such as to make it possible for it to have its operating point (or points) readily adjusted and also in a position which facilitates easy repair, servicing, and maintenance of the valve 38 and servo motor means 26 if such should be required. Also, the arrangement illustrated in the first form of the invention makes it possible to easily adjust the depth of embedment of the moisture-sensing means 36 by any of a variety of different depth-adjusting means such as are better illustrated and described in my co-pending parent application, Ser. No. 880,851, filed on the 28th day of Nov., 1969, now U.S. Pat. No. 3,642,204, and, therefore, not again illustrated and described in detail herein. This is also true with respect to the detailed structure of the entire moisture-sensing means 36, which is also more particularly fully described, illustrated, and claimed in my above-identified co-pending parent patent application and thus is not again illustrated and described in detail herein.

It should be noted that the vacuum duct 38 transmitting the previously mentioned initiating and controlling signal connects at the end thereof remote from the moisture-sensing means 36 to the servo inlet fitting 50 of the servo motor means 26 of the valve means indicated generally at 28. The entire servo motor means 26, in turn, is mounted with respect to the valve means 28 by a servo motor mounting fitting indicated at 52.

The length of the vacuum signal duct 38 positioned between the moisture-sensing means 36 and the servo motor means 26 is merely shown diagrammatically in FIG. 1, but is to be understood as preferably being of a flexible and/or coilable, extendible, and retractable type which will allow appropriate repositioning of the entire moisture-sensing means 36 relative to the servo motor means 26 whenever desired, as is more clearly and specifically described, illustrated, and claimed in my hereinbefore identified co-pending patent application, to which reference is hereby made for specific details thereof, and in the light of which it is believed that a complete, detailed showing thereof in the drawings of the present application and a complete detailed description thereof in this specification would be redundant — particularly since these constructional details do not touch upon the real inventive concept of the present invention.

The exemplary servo motor means, indicated generally at 26 in the first form of the invention, takes one particular representative but non-specifically limiting form wherein it comprises the servo motor housing means or portion 54 defining the servo chamber 56 therein which has a threaded nut portion 58 threadedly mounted therein and which can be threadedly adjusted, by the use of an appropriate tool, or one's fingers, upwardly or downwardly with respect to the rest of the housing portion 54 so as to effectively adjust the initial compression of the biasing spring means 60, which has the effect of controllably adjusting the operating point (or points) of the entire apparatus with respect to the previously mentioned soil suction magnitude, and consequently the water content of, the body of earth 40 around the moisture-sensing means 36 and corresponding to the opening and closing of the water-flow-controlling valve 28. Also, in the exemplary first form of the invention illustrated, the servo motor means indicated generally at 26 includes an effective servo diaphragm 62 (which may be an actual edge-clamped diaphragm, a portion of a bellows, a piston, or any other effective or functional equivalent) appropriately clamped in position between a lower, closed, sealed chamber 64 and the previously mentioned servo chamber 56 which, because of ist connection to the vacuum signal duct 38, is usually at a pressure less than atmospheric and also less than that within the lower, sealed chamber 64 which may be of a predetermined reference magnitude or which may be maintained at atmospheric pressure by appropriate communication therewith. The servo diaphragm 62 effectively carries and operates a rod member 66 which is slidably mounted by what might be called a bearing member or spider 68 and which extends therebelow into a lower portion of the reference pressure chamber 64, where it effectively operates a switch indicated generally by the reference numeral 70, which is normally held open because of the biasing force exerted by the spring 60 which is sufficient to overcome the differential force acting upwardly across the diaphragm 62 because of the differences in pressure of the reference chamber 64 and the upper servo chamber 56 which is at the previously mentioned soil suction pressure, which ranges from atmospheric pressure on down.

Thus, whenever the soil moisture around the moisture-sensing device 36 is in excess of a predetermined minimum value, the electrical switch 70 will be open. However, whenever the moisture of the soil surrounding the moisture-sensing device 36 drops below a predetermined minimum value, the upward-acting differential pressure between the reference chamber 64 and the soil suction pressure chamber 56 of the servo motor means 26 becomes great enough to temporarily override the downward biasing force exerted by the spring 60 to a degree such that the electrical switch 70 closes, which will cause the main valve 28 to open and to feed water through the inlet 44 and the outlet 46 of the main water-flow-controlling valve 28 and out of the sprinklers 34 until the soil has been moistened enough to cause a relative increase of the pressure within the soil suction servo motor chamber 56 to a degree such that the biasing spring 60 can override the upward-acting differential pressure and again open the switch 70, which will cause a cessation of water flow through the main valve 28.

The opening and closing operation of the main vlave 28 under the control of the servo motor means 26, in the exemplary first form of the invention illustrated, is accomplished by what might be termed actuator means, or a main additional servo motor means, which may also be referred to as a power utilization device effectively operated by or controlled by the controlling servo motor means 26, and generally designated by the reference numeral 72 and which, in the example illustrated, is shown as comprising a solenoid including an electrical coil 74 and a ferromagnetic armature 76 which comprises an upward extension of the rod 78 effectively connected to the main valve diaphragm 80. It will be noted that a diaphragm biasing spring 82 is so positioned as to normally maintain the flexible diaphragm or valve member 80 in fully seated, sealed, and engaged relationship upon and effectively closing an annular valve seat 84 so that the entire valve 28 will normally be closed but, when sufficient electrical energy is applied to the actuator solenoid coil 74, because of temporary closure of the previously mentioned switch 70 by the controlling servo motor means 26 in response to receipt of a vacuum signal through the duct 38 from the moisture-sensing means 36 indicating that soil moisture has fallen to less than a predetermined minimum value, to be forcibly upwardly moved by said solenoid actuator 72 so as to temporarily upwardly displace the elastic diaphragm valve member 80 away from the valve seat 84, which will temporarily communicate the inlet and outlet ports 44 and 46 of the valve 28 and cause irrigation of an adjacent body of earth to occur.

Of course, whenever the pressure within the vacuum signal duct 38 rises to a predetermined value as a consequence of the increased water content of a body of earth, such as that shown at 40 in FIG. 1, sensed by moisture-sensing means similar to that shown at 36 in FIG. 1, the biasing spring 60 moves the connecting rod 66 in a manner such as to again open the switch 70 which effectively deenergizes the main actuator or servo motor means 72, which allows the main valve biasing spring 82 to again close the normally closed valve member 80 so as to isolate the inlet and outlet ports 44 and 46 from each other and to stop the "On" cycle of the irrigating operation of the apparatus described above.

Incidentally, it should be noted that the value of soil suction at which the valve 28 is cause to open, may differ somewhat from the value of soild suction at which the valve 28 is caused to close, by reason of the fact that there is a difference in the net upward force exerted on the moving assembly comprising the servo diaphragm 62, the connecting rod 66, and the movable portion of the switch 70 during the valve-closing operation than during the valve-opening operation, which upward-acting force is greater in the case of a valve-opening operation than in the case of a valve-closing operation, thus requiring that the soil suction be reduced to a lower value to open the valve than the soil suction value at which the valve closes. The difference between the two different operating points will determine the relative length of the "On" and "Off" cycles. It should be noted that various other means for providing and/or adjusting the requisite differences in the oppositely directed forces at the valve-opening and/or valve-closing points of operation of the controlling servo motor means and/or the controlled main actuator means, and of any of a variety of different types well known in the art and, therefore, not described in detail, may be employed in lieu of the exemplary arrangement of the first form of the invention just described.

In the exemplary first form of the invention, the previously mentioned power supply apparatus and electrical energy supply means, indicated generally at 22 in block diagrammatic form, is shown in the exemplary version illustrated in FIG. 2 as comprising electrical energy storage means, such as indicated at 86, adapted to be connected with respect to both the controlling servo motor means 26 and the main actuating servo motor means 72 controlled thereby in a manner such as to provide the necessary electric power for operating said main actuator or servo motor means 72, which effectively comprises a power utilization device requiring such an auxiliary source of electric power for energizing same.

In the exemplary form illustrated in FIG. 2, the electrical energy supply means indicated generally at 22 also includes novel charging means for rendering the complete electrical energy supply means 22 and, indeed, all of the apparatus of each distribution station 20, virtually self-contained and self-maintaining so that said apparatus and said distribution station can be completely electrically isolated and insulated from all of the rest of the apparatus and from the structure or housing containing same which, incidentally, may be made of an electrical insulating material and may be fully sealed against water and, if desired, may even be interiorly "potted." In other words, the apparatus can be completely self-contained and need have no exterior electrical connections outside of the individual distribution station, thus rendering it virtually immune from exterior moisture or anything else which might normally tend to cause either shorted or open circuits, electrical leakage, or the like, or which might tend to render such a device inoperative or to require frequent electrical maintenance servicing thereof. This will not be necessary with the completely self-contained and self-maintaining apparatus of the exemplary first form of the invention by reason of the complete electrically isolated and insulated nature thereof, which is primarily made possible by reason of the above-mentioned charging apparatus which is generally designated by the reference numeral 88 in FIG .2.

The above-mentioned charging apparatus 88, in the exemplary but non-specifically limiting form thereof illustrated in FIG. 2 and partially in FIG. 3, comprises pressurized-liquid-flow-powered, electrical generating means, such as is generally designated by the reference numeral 90, which may comprise a tubine rotor, Archimedes-screw rotor, or any other engine element, such as indicated at 92 in diagrammatic form in FIG. 2, and such as is shown in greater detail at 92 in FIG. 3, and which is adapted to be rotated or driven by the flow of pressurized water through the pipe 24 and, in turn, is mechanically coupled in driving relationship, such as is indicated by the phantom-line drive shaft shown at 94 in FIG. 3, to a mechanical-to-electrical energy converter, such as that shown at 96, which may comprise any conventional type of electrical generator or alternator adapted to convert rotary movement of the rotor 92 into corresponding electrical output energy at the terminals 98 and which may be of either a direct-current type or an alternating-current type so that said output terminals 98 will be capable of applying electric current through an optional rectifier means shown in broken lines at 100 in FIG. 2, and normally open switch means, indicated generally at 102 in FIG. 2, to opposite terminals of the electrical energy storage means 86, which may comprise a storage battery or any other suitable electrical energy storage means.

It should be noted that normally the switch 102 is open so that the electrical energy storage means 86 has no opportunity to effectively drive the generator means 96 in a manner similar to the operation of a conventional electric motor, which might other wise be possible in certain other instances. However, just as soon as water flows through the water-flow-powered electrical generating means' rotor 92 and causes electric power-producing operation of the generator means 96, electric current will flow through the shunting relay coil 104 and will close the normally open switch 102, which will then immediately start the charging of the electrical energy storage means or storage battery 86. This charging operation will continue for as long as water flows through the water-flow-powered, electrical generating means' rotor 92 unless this condition continues for such a long period of time that the storage battery 86 would become overcharged, with the consequent likelihood of damage occurring thereto. In order to prevent such an eventuality, a voltage regulator (an over-voltage control switch means) may be connected anywhere between the generator means 96 and the storage battery means 86 for opening the charging circuit if overcharging of the battery begins to occur. Such a voltage regulator is indicated in block diagrammatic form at 106 in FIG. 2 and is shown as controlling a switch 108 in circuit with the shunt coil 104 so that the fully charged condition of the storage battery 86 will be sensed by the voltage regulator 106 and will effectively open the switch arm 108 and maintain it open until the voltage of the storage battery 86 drops below that corresponding to a fully charged condition, at which time the switch 108 will be caused to close and the entire voltage regulator will have no effect upon the rest of the circuit and upon the previously described operation thereof. The interior details of the voltage regulator, indicated in block diagrammatic form at 106, are not shown since such arrangements are well known in the art and do not touch upon the real inventive concept of the present invention.

Figure 5:
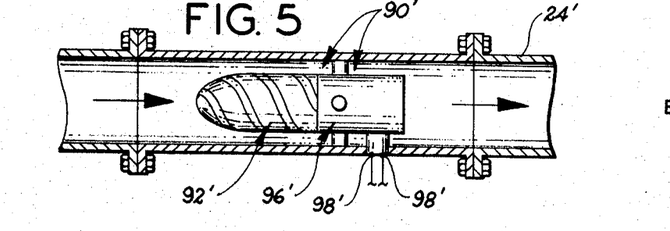
FIG. 5 is a fragmentary view similar to a small portion of FIG. 2 and FIG. 3 and illustrates a very slight modification of the liquid-flow-powered electrical generating means thereof.

It should be noted that the arrangement of the complete water-flow-powered electrical generating means designated by the reference numeral 90 in the first form of the invention is merely representative of one of the many possible forms which it may assume and is not to be construed as specifically limiting the invention to said one representative form thereof, as best illustrated in FIGS. 2 and 3. For example, the rotor 92 and the electrical generator 96 may be mounted as a unit on the pipe 24 (or, for that matter, on any of the other pipes of a complete system through which water or other pressurized liquid is adapted to flow at least periodically), and this may be in an arrangement such that the generator 96 is exterior of the pipe while the rotor 92 is interior thereof, or the arrangement may be what might be referred to as an "in-line construction," with both the rotor 92 and the electrical generator 96 being carried within the pipe. Such a modification is illustrated very fragmentarily in FIG. 5, and parts similar to those of the first form of the invention are designated by similar reference numerals — primed, however.

Figure 4:
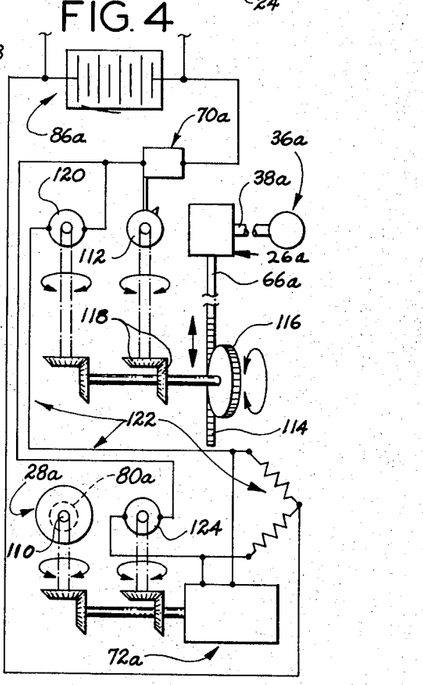
FIG. 4 is a view generally similar to a portion of FIG. 2, but illustrates a slightly modified arrangement wherein the operation of the liquid-flow-controlling valve means by the electrically energized servo motor means is not of just an "On/Off" nature, but is of a proportionate nature in an inverse feedback sense so as to correct the deficient-moisture condition in the earth surrounding the moisture-sensing means by causing the valve to open to a degree such as to cause the sprinkler to sprinkle water on the surface of the earth to an extent which is a function of the magnitude of the moisture deficiency measured by the moisture-sensing means, thus producing a corrective moisturizing of the soil of a magnitude corresponding to the need therefor.

FIG. 4 is a view of a somewhat fragmentary and schematic nature generally similar to the first form of the invention illustrated in FIGS. 1–3, but shows a modification thereof wherein the control of the main valve is not of an On/Off type but instead is of a proportionate, inverse, feedback nature such as to cause an amount of water to be disseminated in an irrigating sense onto a body of earth in a manner which is a proportional direct function of a deficiency of the moisture in said body of earth immediately around a moisture-sensing means such as that shown at 36 in FIG. 1, or is a porportional, inverse function of the moisture in said body of earth. Because this view does illustrate a modification, parts which are functionally or structurally substantially identical to or similar to corresponding parts of the previously described first form of the invention are designated by similar reference numerals, followed by the letter a, however, In the FIG. 4 modification, the valve 28a is no longer of an On/Off type, but instead is of a type where the valve member 80a is adapted to be progressively opened (and, conversely, closed) by rotation of the valve stem 110 so as to make possible a great variation in the flow rate of water passing through the valve 28a and adapted to be disseminated in an irrigating manner with respect to an adjacent body of earth similar to that previously described in connection with the first form of the invention. Furthermore, in this modification of the invention, the servo motor means, indicated generally at 26a, is of a somewhat different type from that shown in the first form of the invention, having two different functions, one of which is generally similar to that of the first form of the invention as shown in FIG. 2 and comprises the closure of a snap-action, two-position switch 70a by means of a rotary cam 112 driven by the member 66a operating the rack 114, a spur gear 116, and two bevel gears 118, said switch 70a being functionally generally similar to the switch 70 of the FIG. 2 form of the invention; and the other function of the above-mentioned two functions, comprising the operation of a rotary variable resistor, such as that designated by the reference numeral 120, which comprises one leg of a bridge circuit generally designated by the reference numeral 122. In other words, the rotary resistor 120 may be said to be a moisture-responsive resistor which has its resistance modified in accordance with an increasing deficiency of moisture in a body of earth surrounding a moisture-sensing means, such as either of the two representative ones shown at 36 in FIG. 1 of the first form of the invention, which thus correspondingly unbalances the bridge circuit 122 as a function of the so-called soil suction sensed by said moisture-sensing means. Also, the main servo motor or actuator means generally indicated at 72a is of a somewhat different type from the one shown at 72 in FIG. 2 and is arranged to progressively controllably modify the resistance of another rotary variable resistor 124 comprising another leg of the bridge circuit 122, while at the same time and in the same manner progressively opening the valving member (such as that indicated at 80a and generally functionally equivalent to the part 80 shown in FIG. 2 of the first form of the invention, although of a rotary proportional type) of the proportional type water valve 28a of this modification of the invention.

Thus, the modified arrangement illustrated in FIG. 4 is such that when a moisture-sensing means 36a (similar to either of the two representative ones shown at 36 in FIG. 1) senses a moisture deficiency in the surrounding earth, the switch 70a is closed, which initiates several operations, as follows. First, it causes a reduction of the resistance of the resistor 120 as a function of the soil suction, or as an inverse function of the moisture content of the soil, which unbalances the bridge 122; and, second, by reason of the imbalance of the bridge circuit 122, the previous zero voltage existing across the main servo motor means or actuator means 72a now becomes a positive voltage thereacross such as to cause it to progressively open the valve member of the proportional type water-flow-controlling valve 28a and, at the same time, to begin to correspondingly modify the resistance of the variable resistor 124. This resistance modification of the resistor 124 (which comprises a reduction thereof in the example just described) will progressively decrease the imbalance of the bridge circuit 122 until there is no voltage across the main servo motor means or actuator means 72a, which will cause it to stop in whatever position it is in when the voltage thereacross reaches zero. This will also cause the valve member of the proportional valve 28a to stop opening at whatever position it is in at that instant and to thereafter remain open to that extent. This condition will then continue until the moisture-sensing means senses an increase in the moisture content of a body of earth surrounding the moisture-sensing means, which will cause a reduction in the soil suction and which will consequently cause the resistance of the variable resistor 120 to be increased, which will cause an oppositely directed voltage to be applied across the main servo motor means or actuator 72a, which, being reversible, will now operate in the opposite direction and will thus cause the resistance of the variable resistor 124 to be increased toward a bridge balancing condition and, at the same time, will cause progressive closing movement of the valving member of the proportional type water-flow-controlling valve 28a. These two actions will continue until the bridge circuit 122 is again in balance, which will remove all voltage from the main servo motor means or actuator 72a and will cause it to cease to operate. Since this may occur before the valve 28a has been completely closed, there will be a further repetition or continuation of this action as more water continues to flow through the partially open valve 28a until such time as the moisture sensed by the moisture-sensing means is such as to correspond to full closure of the valve 28a by the main servo motor means or actuator 72a. This condition can be adjusted by merely adjusting the correlation between the linkage operating the valving member of the proportional valve 28a and the adjustable resistor 124. Also, corresponding adjustment of the variable resistor 120 with respect to the linkage between same and the moisture-sensing means may be provided for adjustment, initial setting, and calibration purposes.

The linkage between the switch 70a and the moisture-sensing means may also be adjusted for such calibration and minimum operating point-adjustment purposes since it is clear that te point in the range of operation of the moisture-sensing means at which the switch 70a is opened (and also the point at which it is closed) determine the inactivation point (and the activation point) of the entire apparatus. Thus, it is possible to control the operating point (or points) of the entire servo means by adjustment thereof.

It should also be noted that in certain forms of the invention, the switch 70a may be eliminated if this particular operating control is not thought necessary.

It should be clearly understood that the invention is not limited to the particular type of linkage and coupling means shown between the differential pressure servo motor means 26a and the rest of the apparatus, nor to the cam means 113 controlling the operation of the switch 70a nor to the rotary variable resistor 120. The arrangement illustrated in FIG. 4 is merely exemplary and is not intended to limit the invention to the particular arrangement of gears shown. Actually, in most instances a pneumatic, hydraulic, or other type of servo means positioned between the member 66a and the switch-operating cam 112 and the rotary variable resistor 120 will probably be employed in order to make it possible for a very small amplitude differential pressure initiating and controlling signal, produced by the previously described apparatus of the invention in response to a small change in moisture content of a body of soil in which the moisture-sensing means is positioned, to be capable of effectively operating the apparatus. A dynamic fluid amplifier means, any of numerous types of conventional hydraulic amplifier means, mechanical amplifier means, or various other types of amplifier means may be employed in lieu of, or in partial combination with, all or any portion of the apparatus illustrated in the FIG. 4 form of the invention, which is purely of an illustrative nature.

Figure 6:
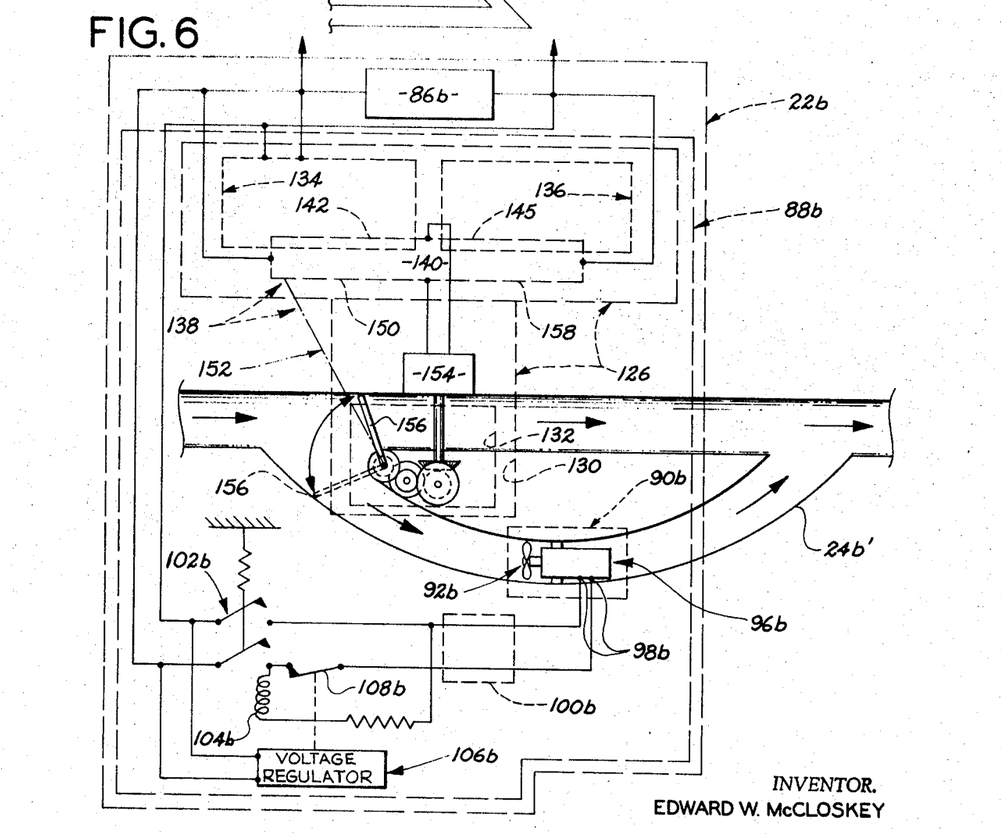
FIG. 6 is a fragmentary view illustrating a slightly modified arrangement for connecting a representative one of the liquid-flow-powered electrical generator means with respect to the main pipe or duct —0— in this case being effectively connected in parallel with respect thereto rather than in series as previously illustrated.
Figure 7:
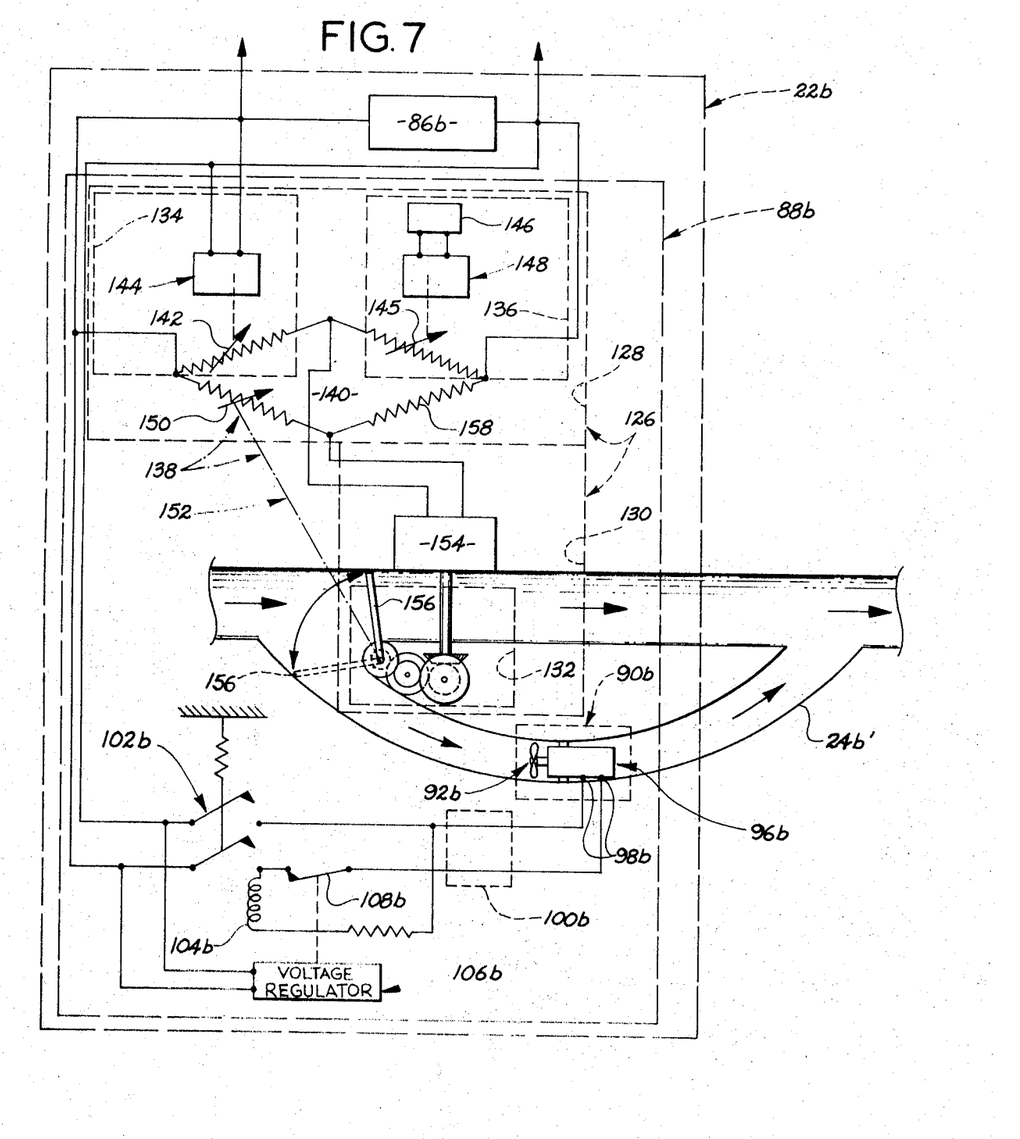
FIG. 7 is a fragmentary, somewhat diagrammatic and schematic view showing in greater detail the generator output modifying means, the comparator, the servo motor means, and the effective negative feedback means, shown primarily in incomplete or block diagrammatic form in FIG. 6, and more clearly illustrates one exemplary form which such elements of the invention may take.

FIGS. 6 and 7 illustrate in fragmentary, somewhat diagrammatic form a further modification of the invention wherein the charging means is somewhat modified from the charging means shown at 88 in FIG. 2 of the first form of the invention. Therefore, this view illustrates only such an exemplary modified form of charging means broken away from the pressurized-liquid-distributing portion of the system which may be substantially identical to that of the first form of the invention or any of the various modifications thereof included in the present invention.

Because FIGS. 6 and 7 do illustrate a modified form of the invention, parts which are structurally or functionally similar to or correspond to previously described and illustrated forms of the invention are designated by similar reference numerals, followed by the letter b, however.

Incidentally, it should be noted that the entire charging means, indicated generally at 88b in this modification of the invention, is similar in many respects to the apparatus illustrated in FIG. 4 and previously described in detail, with the exception of the fact that the apparatus is not coupled to a valve such as that shown at 28a in FIG. 4, but, instead, is coupled to a generator output modifying means which effectively causes the electrical generating means to produce an electrical output which is a function of the deficiency in electrical energy stored by the electrical energy storage means so that it will be quickly recharged when it is in a greatly discharged condition and will be somewhat less rapidly charged when it is in a discharged condition to a lesser degree, and will not be charged at all when it is in an initially fully charged condition. Therefore, the present invention is specifically to be considered as including controller means with negative feedback apparatus or means as a part thereof of the broad general type specifically illustrated in one form in FIG. 4, with the controller and feedback apparatus being coupled relative to a generator output modifying means, rather than to a main pressurized-water-flow valve such as that shown at 28a in FIG. 4, and this broad concept is intended to be specifically included and comprehended within the scope of the present invention.

However, in the exemplary form best illustrated in FIG. 7, the entire electrical energy supply means, indicated diagrammatically at 22b, includes the storage battery 86b which is substantially identical to the storage battery 86 of the FIG. 2 form of the invention and includes a pressurized-liquid-flow-powered electrical generating means, indicated generally at 90b, which is very similar to the electrical generating means indicated at 90 in the FIG. 2 form of the invention, although, in this case, the rotor 92b is of an axial-flow type rather than a centrifugal flow type and the mechanical-to-electrical energy converter 96 is of what might be termed an "in-line" type positioned within the branch pipe or duct 24b', although an electrical generating means of the type shown in FIG. 2 could be employed in lieu of that illustrated in FIGS. 6 and 7 if desired. The FIGS. 6 and 7 modification also includes a means not included in the FIG. 2 form of the invention and comprising a generator output modifying means, indicated generally at 126, and previously referred to immediately hereinabove and which, in the example illustrated, effectively includes an input portion indicated in block diagrammatic form at 128 in FIG. 7, effectively coupled with respect to the electrical energy storage means or storage battery 86b, and an output portion, indicated in block diagrammatic form at 130, effectively coupled with respect to said input portion (in the example illustrated, electrically coupled thereto) in a manner such as to be effectively operated thereby, and effectively coupled with respect to the generator 90b by way of one particular illustrative type of generator output changing means, such as is indicated in block diagrammatic form at 132, in a manner such as to cause a modification of the electrical output produced at the output terminals 98b of the generator 96b which is a function of the deficiency of the electrical energy stored by the storage battery means 86b, as measured by the output voltage thereof in the example illustrated.

In the exemplary form of the invention illustrated fragmentarily in FIGS. 6 and 7, the above-mentioned input portion, indicated in block diagrammatic form by the reference numeral 128, comprises an effective comparator means, such as is indicated in block diagrammatic form at 134, and a reference standard means, indicated in block diagrammatic form at 136, jointly operable to effectively compare the magnitude of electrical energy stored by the electrical energy storage means or storage battery 86b in the example illustrated, as indicated by the output voltage thereof, with a predetermined reference standard provided by said reference standard means for producing a corresponding output error electrical signal of a corresponding magnitude and sense which is a function of the electrical deficiency of the storage battery 86b and which will be in effect used for controlling the operation of the output portion indicated in block diagrammatic form at 130 whereby to cause the electrical generating means 90b to produce output electrical energy of low, medium, or high magnitude depending upon the demand therefor, or the need to quickly recharge the storage battery 86b.

In the exemplary modification illustrated in FIGS. 6 and 7, effective negative feedback means such as is generally indicated at 138 is included and is arranged to be responsive to the extent of movement of the generator output changing means 132 for progressively reducing the magnitude of the previously mentioned output error electrical signal produced by said input portion 128 as a direct function of the deficiency of electrical energy stored by said electrical energy storage means or storage battery 86b whereby to reduce said output error electrical signal to zero magnitude and to effectively de-energize said generator output changing means 132 at an extent of generator output modification which is a function of said stored electrical energy deficiency of the storage battery 86b.

In the example illustrated in FIGS. 6 and 7, said comparator means, said reference standard means, and said effective negative feedback means combine in what might be termed a "Wheatstone bridge means," such as is generally designated by the reference numeral 140 in FIG. 7, which has a first leg provided with a variable impedance or resistor 142 coupled to a voltage or charge-responsive means indicated generally at 144 which is connected to the terminals of the storage battery 86b and effectively measures the electrical energy stored therein, as indicated by the output voltage thereof, and which effectively correspondingly varies the electrical resistance or impedance of the first leg resistor 142. This may be done in an analogous manner to the bridge circuit resistor 120 of the FIG. 4 form of the invention and, therefore, structure for doing this is not again shown in detail in FIG. 7. However, it should be understood that one arrangement for accomplishing this would be to have the voltage-responsive means 144 include a conventional voltmeter-movement rotating and output shaft which either directly, or through suitable amplification, may rotate a rotary rheostat comprising the variable resistor 142, or any other substantially equivalent arrangement may be provided in lieu thereof.

The bridge circuit 140 has a second reference leg having a reference impedance or resistance 145 of a predetermined reference magnitude corresponding to a reference standard voltage such as supplied by a reference standard cell 146 operating a voltage-responsive means 148 which may be similar to that previously described at 144 and thus providing a constant reference resistance in the reference resistor 145. This may also be provided by completely eliminating the elements 146 and 148 and merely providing the proper resistance or impedance to the reference resistor 145.

The bridge circuit 140 may also be provided with a third leg having an impedance or resistor 150 which is variable in the same manner as that of the variable resistor 142 described hereinabove and which is adapted to be similarly modified by way of a negative feedback coupling connection 152 to the servo motor means 154 or the valve means 156 comprising the previously mentioned generator output changing means indicated in block diagrammatic form at 132, or to any of the power transmission elements connecting same, so that the resistance of impedance of said variable feedback resistor 150 will be modified in response to valve-opening movement of the valve 156, in the same manner as is the modification of the storage battery comparator resistor 142 in response to a deficiency of the measured output voltage of the storage battery 86b. The resistor 158 in the fourth leg of the bridge circuit 140 may be of a fixed reference value or may be arranged to be controllably adjustable to provide the proper value for the proper functioning of the complete bridge circuit 140.

It will be noted that whenever the voltage-responsive storage battery electrical-output measuring means 144 perceives a reduced voltage across the storage battery 86b, the resistance of the resistor 142 of the bridge 140 is reduced in magnitude relative to the other resistors and, in particular, relative to the resistance of the reference value resistor 145, causing an unbalanced condition of the Wheatstone bridge 140 and causing a corresponding output error electrical signal to be fed from the center terminals of the bridge 140 to the servo motor 154 in a direction such as to cause it to open the valve 156 to an extent which is ultimately determined by the voltage deficiency measured by the means 144. This is so because, as the valve 156 is opened, it also reduces the magnitude of the resistance of the feedback resistor 150 until the center terminals of the bridge 140 are again effectively in balance, at which time the output error electrical signal previously fed to the servo motor 154 is terminated and the servo motor 154 and the valve 156 both stop in that particular partially open position which is a function of the initially measured voltage deficiency of the storage battery 86b correspondingly, the flow of pressurized liquid or water along the main pipe 24b is partially diverted into the branch pipe 24b' so as to impinge upon the generator rotor 92b to a corresponding extent and cause the electrical generator part 96b thereof to produce output electrical energy of a corresponding magnitude which is then fed through optical rectifier means 100b and through switch means 102b similar to the switch means 102 shown in FIG. 2 form of the invention to the storage battery means 86b for recharging same. The entire device may be under the control of voltage regulator means 106b in a manner similar to that previously described in connection with the first form of the invention illustrated in FIG. 2.

It will be noted that as the storage battery is recharged, the output voltage thereof measured by the unit shown at 144 will rise which will correspondingly increase the resistance of the storage battery resistor 142 of the bridge 140 and tend to unbalance the center points of said bridge in a sense opposite to that previously described hereinabove which will thus apply oppositely directed voltage to the reversible motor 154 and will cause it to move the valve 156 in an opposite direction toward closed relationship as shown in broken lines in FIG. 6. The above-mentioned type of operation will continue until the storage battery 86b is fully charged and the valve 156 is fully closed so that all of the water flow is through the main pipe 24b. However, as soon as the storage battery charge becomes depleted, the first above-mentioned type of operation will occur and a portion of th pressurized flowing water corresponding to the storage battery charge deficiency will be caused to operate the electrical generating means 90b as a function of the need therefor until the storage battery is again fully recharged and the valve 156 is again closed.

FIG. 8 illustrates a slight modification of the FIGS. 6 and 7 form of the invention wherein the generator output changing part is the major portion of the apparatus which is modified from the form illustrated in FIGS. 6 and 7. In this modification, parts which are functionally or structurally similar to the FIG. 7 modification are designated by similar reference numerals, followed by the letter c, however. It should be noted that the generator output changing part 132c, in this modification of the invention, is of a slightly different type from that illustrated in the FIGS. 6 and 7 form of the invention and comprises rotor orientation modifying means 156c adapted to effectively modify the pitch or the coupling of the generator rotor 92c with respect to the pressurized flowing liquid flowing through the pipe 24c and to thus correspondingly modify the drive of the electrical generator part 96c of the composite unit so as to correspondingly modify the electrical output thereof at the output terminals 98c. Of course, the variable pitch control 156c also has the feedback connection 152c to the negative feedback 138c, which of course includes a bridge means 140c such as that shown at 140 in FIG. 7 although not again shown in detail in FIG. 8, so as to provide the type of negative feedback previously described in connection with the FIGS. 6 and 7 form of the invention wherein the movement of the valve 156 was coupled to said negative feedback means while, in the FIG. 8 form of the invention, it is the movement of the variable pitch control 156c which is effectively coupled to said negative feedback means in a functionally similar manner. Otherwise, the FIG. 8 form of the invention is very similar to the form illustrated in FIGS. 6 and 7, and no further detailed description thereof is thought necessary because of said similarity.

Figures 9, 10:
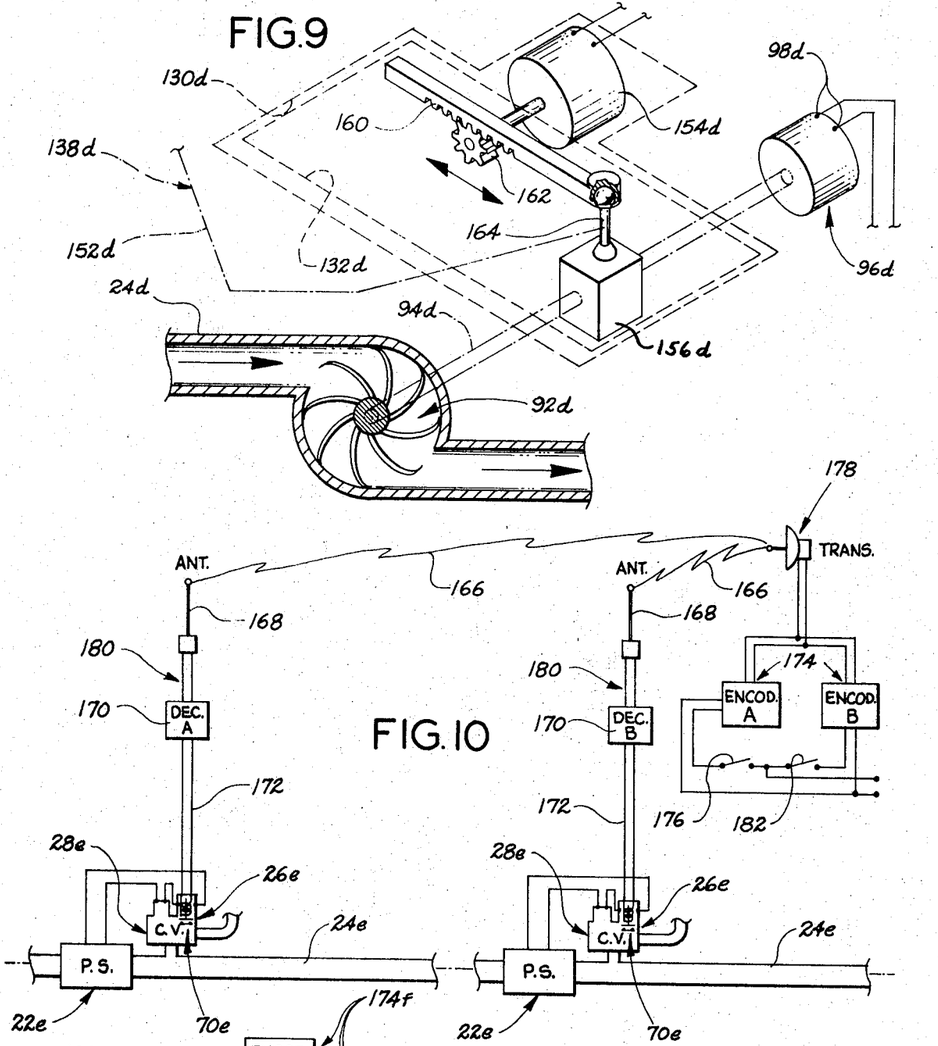

FIG. 9 is a further modification of the invention shown fragmentarily and primarily relates to another variation in the generator output changing means or part of the output portion which, in this case, is shown enclosed in a broken-line diagrammatic box generally indicated by the reference numeral 132d. Indeed, all parts of this modification which are structurally or functionally similar to the form of the invention illustrated in FIGS. 6 and 7 or the form illustrated in FIG. 8 are designated by similar reference numerals, followed by the letter d, however. As illustrated in FIG. 9, said generator output changing part 132d of the complete output portion shown enclosed in the broken-line box indicated by the reference numeral 130d takes the form of a variable-ratio power transmission means 156d coupled between the generator means 96d and the generator rotor 92d so as to vary the effective coupling therebetween to correspondingly vary the electrical output at the generator output terminals 98d. In the example illustrated, the generator output changing part 132d comprising said variable ratio transmission 156d is operated by the servo motor means 154d through a rack 160 and pinion 162, with the pinion being driven by the reversible servo motor 154d and with the rack 160 being coupled to the shifting lever 164 of th variable-ratio transmission 156d and being also coupled by a feedback coupling connection such as that shown diagrammatically at 152d to a Wheatstone bridge means of the rest of the apparatus similar to that shown at 140 in the FIGS. 6 and 7 modification of the invention and not again repeated in FIG. 9 for space-saving reasons.

It should be noted that the variable-ratio transmission 156d may be arranged to have a neutral or non-coupled position at one or the other end of its travel corresponding to a fully charged condition of a storage battery such as that shown at 86b in the FIGS. 6 and 7 modification of the invention.

FIG. 10 illustrates in very fragmentary, diagrammatic form a remotely controlled modification of the invention wherein the control valve or other power utilization device, such as is indicated at 28e, is associated with the pipeline 24e which might, for example, be an oil pipe line, or the like, although not specifically so limited, in any desired flow modifying or diverting manner, and the power supply apparatus or electrical energy supply means indicated generally at 22e is arranged to be energized by flow of pressurized liquid through the pipeline 24e in the same manner as that described hereinbefore and is also arranged to have a self-charging feature of any of the various types referred to hereinbefore. The major difference of this modification is the fact that the initiating or controlling signal which, in the previously described forms of the invention, comprises a vacuum signal fed through the vacuum signal duct 38, is replaced by a remote electromagnetic wave or radio signal, such as is indicated by the reference numeral 166, which is received by corresponding receiving means, such as either of the two representative radio antennae indicated at 168, which is then fed into a corresponding decoder 170 which effectively rejects any signal which does not bear a corresponding encoding pattern or characteristic corresponding to a throughpassing pattern or characteristic of that particular decoder. If a particular decoder 170 effectively passes through the received signal, it then is transmitted downwardly through appropriate lead means 172 into the servo motor means 26e, which merely comprises a solenoid operating the switch 70e instead of its being operated by a variation in vacuum line pressure transmitted thereto by a vacuum signal line such as that shown at 38 in FIG. 2 of the first form of the invention. Therefore, if encoder A of a remote transmitting station, designated generally by the reference numeral 174, is effectively activated by closure of the representative manual switch 176, the transmitter and antenna indicated generally at 178 transmits the electromagnetic or radio signal 166 which is effectively modulated or otherwise provided with the particular encoding pattern or characteristic provided by encoder A only and this will effectively be passed only by the decoder A indicated at 170 of one of the two remote receiving stations, each of which is generally designated by the reference numeral 180, so that only the corresponding control valve or other power utilization device 28e will be effectively operated thereby. The other decoder B indicated at 170 of the other receiving station will not be operated as a result of the remote closure of switch 176. However, remote closure of the other representative manual switch 182 will cause encoder B to modulate the signal transmitted by the transmitter and antenna indicated at 178, which will be allowed to pass only by the decoder B of the two different decoders 170 of the two differently located receiving stations 180 so only the other control valve or power utilization device 28e will be correspondingly operated. The decoder A will not effectively pass said signal modulated by the encoder B pattern or characteristic.

Thus, it is possible from a single transmitting station to control any or all of a plurality of remote receiving stations. It is also possible to do this substantially automatically in a preprogrammed manner rather than by manual operation of the representative switches 176 or 182, as is fragmentarily illustrated in FIG. 11 where a preprogrammed computer unit, indicated generally in block diagrammatic form at 184, may be arranged to be provided with a program in advance covering any desired subsequent period of time and/or any desired individual contingencies, or plurality of contingencies, and may be adapted to automatically and under predetermined conditions or at predetermined times activate encoder A, encoder B, or encoder C or any combination thereof and each of which is generally indicated by the reference numeral 174f so as to correspondingly modulate the control signal 166f transmitted from the transmitting station and antenna means indicated at 178f. This type of system may be arranged to control as many individual distribution stations as desired and in relatively simple or extremely complex and interlocking fashions, all in accordance with the program provided in the computer unit.

Figure 11:
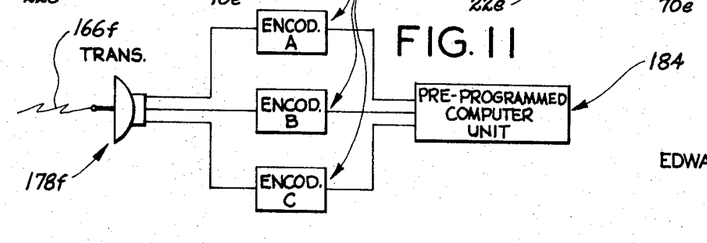
FIG. 11 is a fragmentary view of a modified form of the remote control signal transmitting station of FIG. 10 illustrating a modified pre-programmed computer-operated form thereof.

Incidentally, it should be noted that the switches 176 and/or 182 illustrated in FIGS. 10 or the preprogrammed computer unit indicated generally in block diagrammatic form at 184 in FIG. 11, the controlling and indicating signal transmitted by the transmitter means operated thereby, the corresponding encoders and decoders, and the corresponding apparatus controlled thereby at one or more of the individual distribution stations may alternatively or additionally be arranged to control the operation of the charging means, if desired, in addition to, or as an alternative to, the above described controlling of valve means or other power utilization means at one or more of such distribution stations from the remote transmitting station.

Attention is further directed to the fact that the particular type of initiating or controlling signal, such as the vacuum signal fed through the vacuum signal duct 38 of the first form of the invention, the radio signal 166 of the FIG. 10 form of the invention, or the radio signal 166f of the FIG. 11 form of the invention is not limited to any one of the illustrated forms which are exemplary only, but may take a great variety of different forms within the broad scope of th present invention. For example, the initiating and controlling signal might be a pressure signal or might be a differential pressure signal of either a positive or negative type, might be an electrical signal, a mechanical signal, an optical signal, a sound wave signal, or, indeed, a signal of any of a great variety of well-known types, produced in any of a great many different ways, and it is to be clearly understood that the invention is intended to include and comprehend the provision of such an initiating and controlling signal (and apparatus for sending and/or receiving same) of any of the types referred to above or any other functionally equivalent types.

It should be understood that the figures and the specific description thereof set forth in this application are for the purpose of illustrating the present invention and are not to be construed as limiting th present invention to the precise and detailed specific structure shown in the figures and specifically described hereinbefore. Rather, the real invention is intended to include substantially equivalent constructions embodying the basic teachings and inventive concept of the present invention.

What is claimed is:

1. A remote, completely self-contained, self-maintaining power supply apparatus for powering a pressurized-liquid distributing, and disseminating system, comprising: a pressurized-liquid distriburing and disseminating system portion including at least a portion of a main pipe means provided with a pressurized liquid flowing therethrough and provided with at least one power utilization device, and controlling servo motor means, connected thereto and adapted to have a controlled amount of said pressurized liquid fed therethrough; electrical energy supply means including electrical generating means and electrical energy storage means and first energy-storing coupling means taking the form of an electric circuit means interconnecting said electrical generating means and said electrical energy storage means in an energy-storing manner, said electrical generating means being provided with fluid motor means coupled thereto and in driving relationship thereto and being positioned within the path of flow of at least a portion of said pressurized liquid flowing through said main pipe means and responsive to such flow for periodically producing electrical energy during periods when said pressurized liquid flows relative to said electrical generating means and for storing, by ways of said electric circuit means, said electrical energy in said electrical energy storage means during said periods, said electrical energy storage means being provided with second coupling means comprising electric circuit means controllably effectively connected in an energy-releasing manner with respect to said servo motor means coupled with repect to said power utilization device associated with said main pipe means in a particular desired manner for modifying the flow of said liquid through said power utilization device; said first coupling means including coupling switch means provided with and controlled by activation means for causing said effective coupling of said first coupling means in said energy-storing manner with respect to said electrical energy storage means only when said electrical energy storage means has stored therein less than a predetermined magnitude of electrical energy, as indicated by the output voltage thereof, and including generator output modifying means, for modifying and controlling the output of said electrical generating means, effectively coupled with respect to said electrical generating means during said periods of flow of said perssurized liquid through at least a portion of said main pipe means and relative to said fluid motor means driving said electrical generating means, in a manner modifying the electrical output thereof as a direct function of, and in response to, the deficiency of said electrical energy stored in said electrical energy storage means, said generator output modifying means comprising an input portion effectively coupled with respect to said electrical energy storage means and an output portion effectively coupled with respect to said electrical generating means in a manner correspondingly modifying both the mechanical output of said fluid motor means and the electrical output of said electrical generating means, said output portion comprising a reversible servo motor means and generator output changing means coupled to said servo motor means, with said servo motor means being effectively electrically energized by said output error electrical signal produced by said input portion, said servo motor means effectively controlling input to the electrical generating means in inversely proportionate response to the charge output of said electrical energy storage means.

2. Apparatus as defined in claim 1, wherein said input portion comprises an effective comparator means for comparing the magnitude of electrical energy stored by said electrical energy storage means with a predetermined reference standard and for produing a corresponding output error electrical signal of a corresponding magntiude and sense.

3. Apparatus as defined in claim 2, including effective negative feedback means responsive to the extent of movement of said servo motor means and said generator output changing means moved thereby for progressively reducing the magnitude of said output error electrical signal produced by said input portion as a function of the deficiency of said electrical energy stored by said electrical energy storage means whereby to reduce said output error electrical signal to substantially zero magnitude and to deenergize said servo motor means coupled to said generator output changing means at an extent of the generator output modification, which is a function of said stored electrical energy deficiency.

4. Apparatus as defined in claim 1, wherein said generator output changing means part of said output portion comprises controllably adjustable valve means for modifying the flow of such pressurized liquid effectively coupled in driving relationship with respect to said fluid motor means driving said electrical generating means.

5. Apparatus as defined in claim 1, wherein said fluid motor means driving said electrical generating means comprises rotor means, including blade means, coupled in driven relationship with respect to said flow of said pressurized liquid, and wherein said electrical generating means further includes a mechanical-to-electrical energy converter means driven by said rotor means and operable to convert rotary mechanical movement into corresponding electrical output energy, said generator output changing means part of said output portion comprising rotor means orientation modifying means operable to modify blade pitch of the blade means thereof for effectively correspondingly modifying the coupling of said rotor means with respect to said flow of said pressurized liquid.

6. Apparatus as defined in claim 1, wherein said fluid motor means driving said electrical generating means comprises rotor means, including blade means, coupled in driven relationship with respect to said flow of said pressurized liquid, and wherein said electrical generating means further includes a mechanical-to-electrical energy converter means driven by said rotor means and operable to convert rotary mechanical movement into corresponding electrical output energy, said generator output changing means part of said output portion comprising variable ratio power transmission means effectively positioned between said rotor means and said mechanical-to-electrical converter means for changing the ratio of the driven rotation of said converter means relative to said rotor means in a manner correspondingly modifying the electrical output produced by said converter means.

7. A remote, completely self-contained, self-maintaining power supply apparatus for powering a pressurized-liquid distributing, and disseminating system, comprising: a pressurized-liquid distributing and disseminating system portion including at least a portion of a main pipe means provided with a pressurized liquid flowing therethrough and provided with at least one power utilization device, and controlling servo motor means, connected thereto and adapted to have a controlled amount of said pressurized liquid fed therethrough; electrical energy supply means including electrical generating means and electrical energy storage means and first energy-storing coupling means taking the form of an electric circuit means interconnecting said electrical generating means and said electrical energy storage means in an energy-storing manner, said electrical generating means being provided with fluid motor means coupled thereto and in driving relationship thereto and being positioned within the path of flow of at least a portion of said pressurized liquid flowing through said main pipe means and responsive to such flow for periodically producing electrical energy during periods when said pressurized liquid flows relative to said electrical generating means and for storing, by way of said electric circuit means, said electrical energy in said electrical energy storage means during said periods, said electrical energy storage means being provided with second coupling means comprising electric circuit means controllably effectively connected in an energy-releasing meanner with respect to said servo motor means coupled with respect to said power utilization device associated with said main pipe means in a particular desired manner for modifying the flow of said liquid through said power utilization device; generator output modifying means comprising an input portion effectively coupled with respect to said electrical energy storage means and having an output portion effectively coupled with respect to said electrical generating means in both a mechanical and electrical output modifying manner during said periods when said pressurized liquid flows relative to said electrical generating means whereby the modification of the electrical output thereof is a function of, and is in response to, the deficiency of said electrical energy stored in said electrical energy storage means, said input portion comprising an effective comparator means for comparing the magnitude of electrical energy stored by said electrical energy storage means with a predetermined reference standard and for producing a corresponding output error electrical signal of a corresponding magnitude and sense, said output portion comprising a reversible servo motor means and generator output changing means coupled to said servo motor means, with said servo motor means being effectively electrically energized by said output error electrical signal produced by said input portion; effective negative feedback means responsive to the extent of movement of said servo motor means and said generator output changing means moved thereby for progressively reducing the magnitude of said output error signal as a function of the deficiency of said electrical energy stored by said electrical energy storage means, whereby to reduce said output error electrical signal to substantially zero magnitude and to de-energize said servo motor means at an extent of generator output modification, which is a function of said stored electrical energy deficiency; said input portion comparator means and said effective negative feedback means comprising electrical bridge means having a first leg provided with an impedance effectively variable in response to said deficiency of the electrical energy stored in said electrical energy storage means, a second leg having an impedance of a predetermined magnitude corresponding to and effectively a function of a reference standard, and a third leg connected in parallel to said first leg and having an impedance modifiable by said effective negative feedback means and having a fourth leg provided with a reference standard impedance.

* * * * *